JOHN F. BRIGHT.

Implement for Cutting Sheet Material.

No. 124,114. Patented Feb. 27, 1872.

UNITED STATES PATENT OFFICE.

JOHN F. BRIGHT, OF WASHINGTON, DISTRICT OF COLUMBIA, ASSIGNOR TO HIMSELF AND GEO. W. BAUER, OF SAME PLACE.

IMPROVEMENT IN IMPLEMENTS FOR CUTTING SHEET MATERIALS.

Specification forming part of Letters Patent No. 124,114, dated February 27, 1872.

Specification describing a tool for cutting sheets of wet or pasted paper, waste, and cardboard, woven fabrics, leather, zinc, or lead, invented by JOHN F. BRIGHT, of Washington city, in the District of Columbia.

The invention will first be fully described and then clearly pointed out in the claim.

Figure 1:
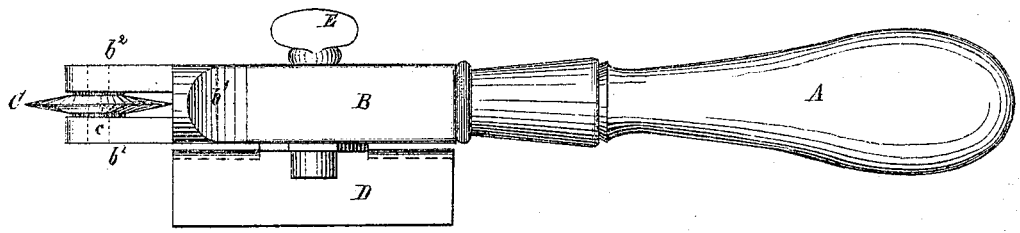
Figure 2:
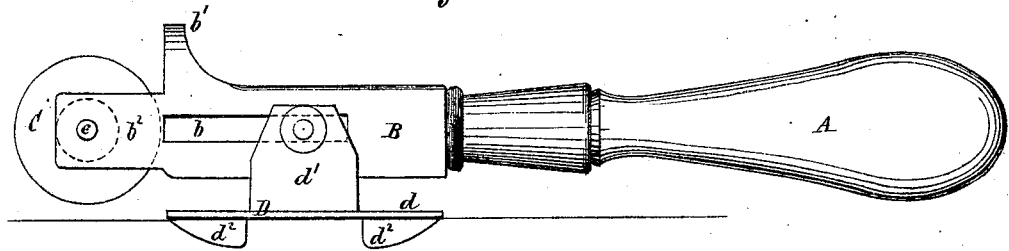

Figure 1 of drawing is a plan, and Fig. 2 a side elevation of my improved tool.

A is the handle, which may be placed at right angles to the stock, for cutting heavy leather, by means of an aperture therethrough. B is the stock, C the cutter, D the gauge, and E a clamping-screw. The stock B has a long slot, $b$, a thumb-stop, $b^1$, and prongs $b^2$ $b^2$ at the end. Between these prongs is placed the rotary cutter C, upon a shaft, $c$. The gauge D consists of plate $d$, shank $d^1$, and projections $d^2$ $d^2$. It may be used, by means of an additional nut, on either side of the socket.

The mode of operation is as follows: The gauge D being placed at the proper angle to the tool and the loosened screw E advanced or withdrawn to the proper point in slot $b$ the said screw is made to clamp it tightly. The straight-edge, of suitable size, being then placed beneath the gauge, the tool set in the line of cut desired, and the thumb brought to bear upon the stop $b^1$, the tool is pushed forward over the sheet.

By practical experiment I have found this device to do its work with great accuracy and perfection. It may, also, be applied to machinery with great facility, as it is only necessary to attach the shank to a bar, pitman, lever, or slide of suitable construction.

Having thus described all that is necessary to a full understanding of my invention, what I esteem to be new, and desire to protect by Letters Patent, is—

1. The combination of a rotary cutter, C, with a guage, D, constructed and arranged to operate in connection therewith, as and for the purpose described.

2. As a new article of manufacture, a tool consisting of stock B $b^1$ $b^2$, gauge D $d^1$ $d^2$, clamping-screw E, and rotary tool C, all constructed and arranged substantially as and for the purpose described.

JOHN F. BRIGHT.

Witnesses:
SOLON C. KEMON,
GEORGE W. BAUER.